(12) United States Patent
Vian

(10) Patent No.: US 6,173,218 B1
(45) Date of Patent: Jan. 9, 2001

(54) NEUROCOMPUTING CONTROL DISTRIBUTION SYSTEM

(75) Inventor: John L. Vian, Renton, WA (US)

(73) Assignee: The Boeing Company, Seattle, WA (US)

( * ) Notice: Under 35 U.S.C. 154(b), the term of this patent shall be extended for 0 days.

(21) Appl. No.: 08/950,966

(22) Filed: Oct. 15, 1997

(51) Int. Cl.⁷ .............................. G05D 1/00; G05D 3/00; G06F 7/00; G06F 17/00
(52) U.S. Cl. .................................. 701/1; 701/59; 706/15; 706/20; 706/44
(58) Field of Search ..................... 701/1, 58, 45, 701/46, 59; 706/15, 23, 25, 38, 39, 44, 20, 26, 27; 244/122 AE, 122 AB, 122 R

(56) References Cited

U.S. PATENT DOCUMENTS

| | | | |
|---|---|---|---|
| 5,705,956 | * 1/1998 | Neely | 331/25 |
| 5,781,701 | * 7/1998 | Wang | 395/24 |
| 5,943,295 | * 8/1999 | Varga et al. | 367/99 |
| 5,943,660 | * 7/1999 | Yesildirek et al. | 706/10 |

\* cited by examiner

Primary Examiner—William A. Cuchlinski, Jr.
Assistant Examiner—Gertrude Arthur
(74) Attorney, Agent, or Firm—Christensen O'Connor Johnson & Kindness PLLC

(57) ABSTRACT

A method and system for controlling a propulsion system of a vehicle. The propulsion system includes at least one propulsion effector. The system also includes sensors for sensing vehicle position and motions, a control device for generating control signals, and a generator for generating desired vehicle forces/moments from the sensed vehicle position and motions and the generated control signals based on predefined vehicle compensation and control laws. Also included is a neural network controller for generating propulsion commands for the at least one propulsion effector based on the generated desire forces/moments, wherein said neural network controller was trained based on pregenerated vehicle control distribution data.

20 Claims, 8 Drawing Sheets

NEUROCOMPUTING CONTROL DISTRIBUTION SYSTEM

FIELD OF THE INVENTION

This invention relates to methods and system for performing propulsion control in a vehicle and, more particularly, to methods and system for accurately determining propulsion commands in real-time.

BACKGROUND OF THE INVENTION

While, as will be understood from the following description, the present invention was developed for generating accurate and time-critical propulsion commands for a vehicle's propulsion system.

Propulsion systems in vehicles, such as vertical takeoff and landing aircraft, satellites and ejection seats, provide forces for controlling the operation of the vehicle. These propulsion systems are controlled by controllers that provide control distribution commands to the propulsion systems. The control distribution commands must provide timely and accurate commands in order for the propulsion system to keep the vehicle operating within predefined limits. For example, the controller in a vertical takeoff and landing aircraft must accurately supply control distribution commands to the propulsion system according to analysis of pilot entered commands, aircraft position and motion, and predetermined limits of the propulsion system, aircraft, and pilot. If the control distribution commands are untimely or inaccurate, jet engine response can lag or misinterpret pilot inputs to the point of causing dangerous pilot induced oscillations. If the control distribution commands are inaccurate, jet engine total flow requirements will not be satisfied leading to engine flameout, degraded performance, or catastrophic failure.

Currently, controllers provide control distribution commands using iterative or multiple step algorithms implemented on digital microprocessors. This approach includes linear optimization or pseudo-inverse procedures that are inherently iterative in nature and have varying times of convergence. Iterative algorithms, when used for complex vehicle control, require extensive calculations and thus, have difficulty performing the required computations in real-time. When the iterative and multiple step algorithms cannot be executed in real-time, non-optimal approximate solutions are generated, thereby reducing the accuracy of the control distribution commands.

Another method of generating control distribution commands is a non-iterative linear technique, which uses mode switching when control limits are reached. This results in complex mode switching logic that is impractical to implement and verify. Another method implements multi-dimensional linearly interpolated data tables. This method requires excessive memory to store the data and is unable to execute the linear interpolation algorithms in real-time.

In summary, the present methods for providing control distribution commands require excessive microprocessor memory and complex mode switching, and are generally insufficient for providing real-time implementation.

The present invention is directed to overcoming the foregoing and other disadvantages. More specifically, the present invention is directed to providing a method and system for generating accurate control distribution commands in real-time.

SUMMARY OF THE INVENTION

In accordance with this invention, a method and system for generating propulsion commands for controlling a propulsion system of a vehicle is provided. The propulsion system includes at least one propulsion effector. The system includes at least one sensor for sensing vehicle position and motion, a control device for generating control signals, and a generator for generating desired vehicle forces/moments from the sensed vehicle position and motion and the generated control signals based on predefined vehicle control laws. Also included is a neural network controller for generating propulsion commands for the at least one propulsion effector based on the generated desired forces/moments, wherein said neural network controller was trained based on pregenerated vehicle control distribution data.

In accordance with other aspects of this invention, the vehicle control distribution data is generated off-line using a linear iterative search algorithm that determines propulsion effector commands from the desired vehicle forces/moments. The linear iterative search algorithm proportionally deviates desired forces/moments or deviates in a prioritized order from desired forces/moments to determine propulsion effector commands.

In accordance with still other aspects of this invention, the neural network controller is a unified or a decoupled structure with activation functions. The activation functions are sigmoidal, radial basis or linear functions.

In accordance with further aspects of this invention, the neural network controller is trained off-line using dynamic derivatives and a node decoupled extended Kalman filter technique or a gradient descent technique.

In accordance with yet other aspects of this invention, the neural network controller is implemented as an analog electronic circuit, a computer program, or an application specific integrated circuit.

As will be readily appreciated from the foregoing summary, the invention provides a new and improved method and system for providing control distribution commands to a vehicle's propulsion system. Because command processing time is greatly reduced, time delays in processing control commands and dangerous propulsion system responses are avoided.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
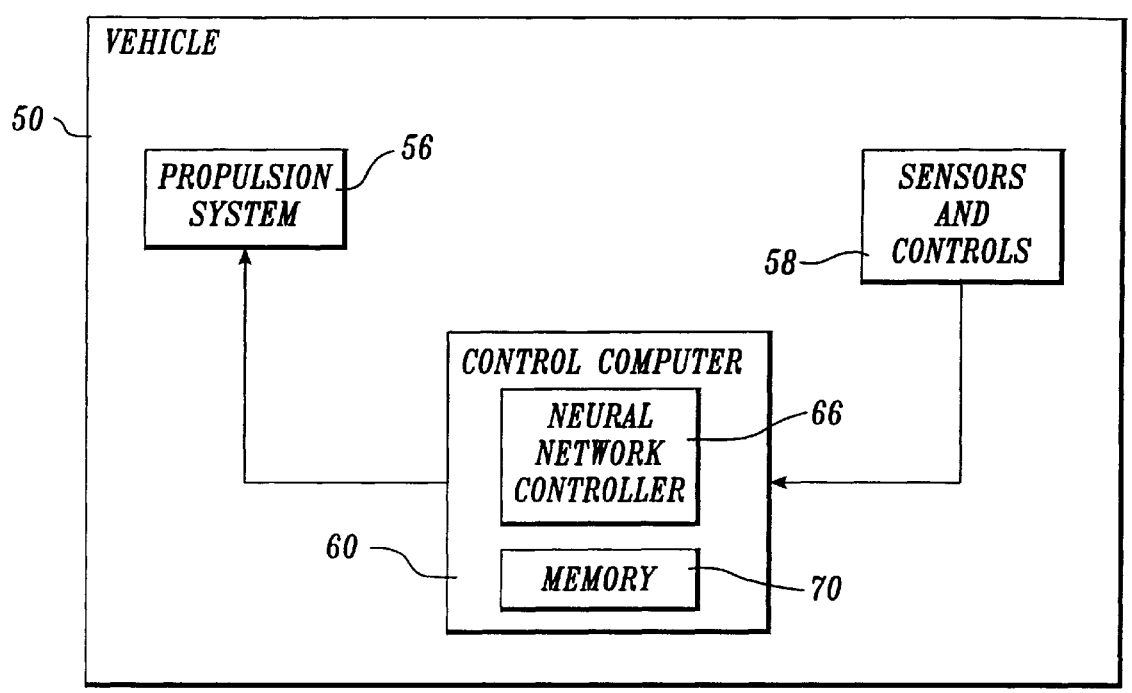
FIG. 1 is a block diagram of a vehicle with a control computer for controlling a propulsion system according to the present invention.

FIG. 1 illustrates the components of a neurocomputing control distribution system formed in accordance with the present invention. A vehicle 50 includes some type of propulsion system 56, sensors and controls 58 for sensing propulsion system and vehicle operation and receiving control commands, and a control computer 60 for determining desired vehicle forces/moments and generating propulsion system control signals. Propulsion system 56 includes one or more control effector for providing propulsion. Examples of vehicle 50 are an airplane, a helicopter, an ejection seat, a satellite, or other vehicles with propulsion systems that require control. The control computer 60 includes a neural network controller 66 and memory 70. Prior to implementation of the neural network controller 66, the neural network controller 66 is trained off-line, using a simulation of the vehicle and its propulsion system to acquire knowledge of actual vehicle operation. The type of neural network and training process used is described in more detail below with respect to FIGS. 2–4.

Figure 2:
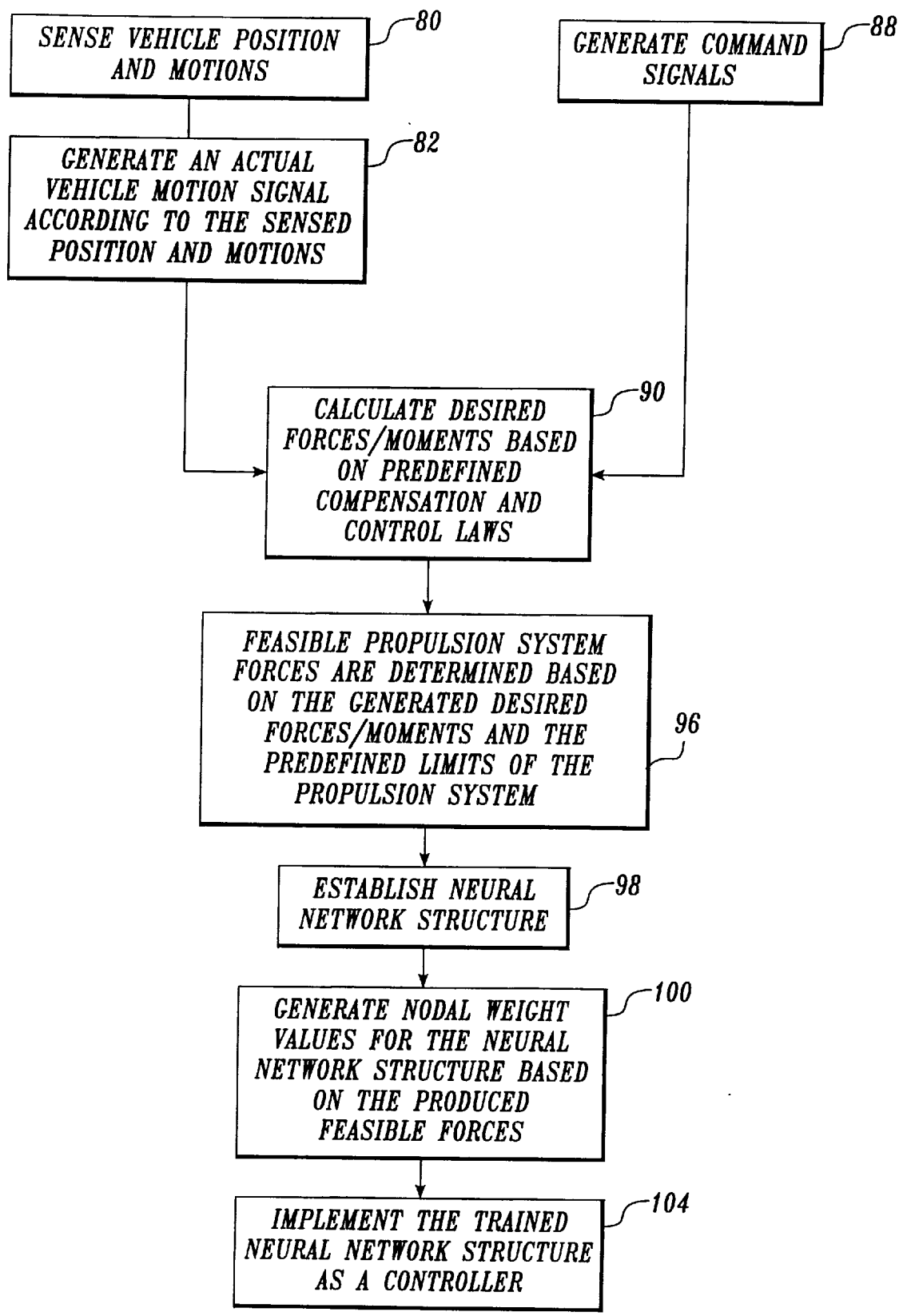
FIG. 2 is a flow diagram illustrating the creation of a neural network controller used in the control computer of the present invention.

FIG. 2 illustrates the neural network controller 66 creation process. First, at block 80, vehicle position and motions are sensed. An actual motion signal is generated based on the sensed vehicle position and motions. See block 82. The types of positions and motions sensed are based on the nature of the vehicle 50. Examples of positions are roll, pitch and yaw axes positions, and examples of motions are linear and angular velocity and acceleration. Simultaneously, at block 88, command signals are generated from either pilot or operator input or from automatic preset commands. Then, at block 90, desired linear and angular forces are calculated based on predefined vehicle compensation and control laws. These calculations are conducted off-line, i.e., they are not conducted in real-time. The off-line calculations are preferably performed on computer programmed to simulate the vehicle. As can be readily appreciated by those of ordinary skill in the art of propulsion control systems, the predefined compensation and control laws are determined by the nature of the vehicle and the type of vehicle sensors employed.

Next at block 96, feasible propulsion system forces are calculated based on the generated desired forces/moments and the predefined limits of the propulsion system. Again these calculations are conducted off-line. Desired force/ moment generation is performed for numerous and extreme possible combinations of vehicle positions and motions. As a result, feasible propulsion system forces are calculated for nearly all possible vehicle positions and motions. An example of one technique for generating feasible propulsion system forces is a linear iterative search algorithm that iteratively reduces the generated desired forces/moments by a proportionate amount until a reduced force/moment is within the predefined limits of the propulsion system. Other algorithms or techniques, such as deviating in a prioritized order from the desired forces, may be used to determine feasible propulsion system forces. All off-line computations of the control distribution data are performed on a vehicle simulation computer with comparable processing power to that of the vehicle's control computer. As a result, the off-line computations are performed as they would be in a traditional on-line control computer. Once the process for producing feasible propulsion system forces is complete, a neural network is established and trained according to the generated desired forces/moments and feasible propulsion system forces; the combination of which is the propulsion system's control distribution data.

Figure 3A:
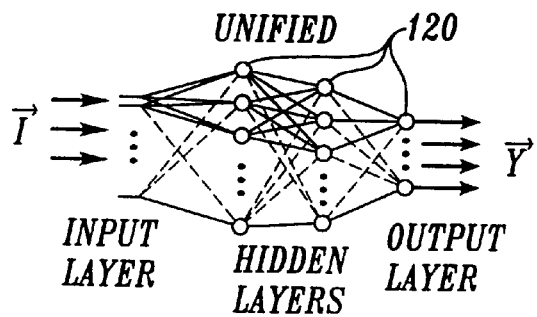
FIGS. 3A and 3B are diagrams illustrating neural model network structures used in the present invention.
Figure 3B:
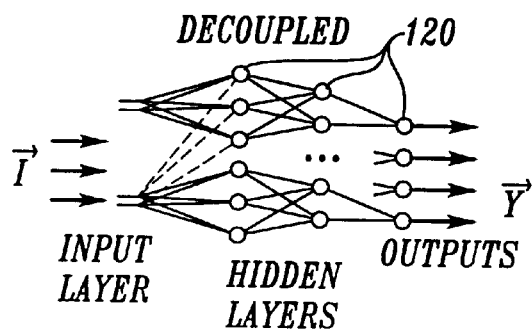
Figure 5:
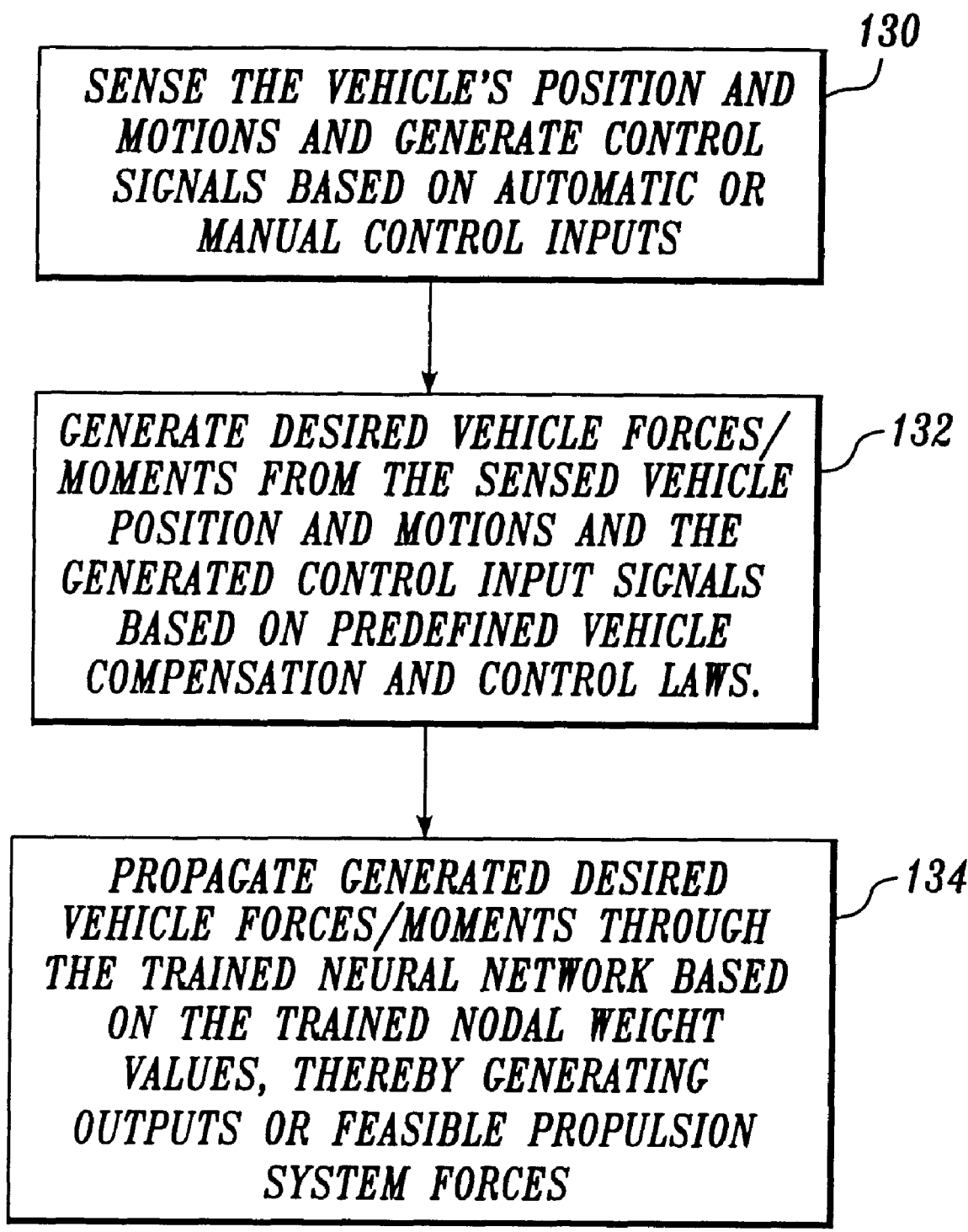
FIG. 5 is a flow diagram illustrating the process of using a trained neural network in accordance with the present invention.

Still referring to FIG. 2, at block 98, the neural network structure is established. The neural network structure includes inputs for all the different desired forces/moments and control outputs for all the corresponding feasible propulsion system forces that are supplied to the control effectors of the vehicle's propulsion system 56. As shown in FIG. 3A and 3B, the neural network structure used in the present invention is either a unified or decoupled multi-layer perceptron artificial neural network. Next at block 100, the neural network structure teaching algorithm generates nodal weight values for the established neural network structure based on the generated control distribution data (desired forces/moments and the feasible propulsion system forces). Back-propagation algorithms, node decoupled extended Kalman filter methods, or other neural network training techniques can be used to perform this nodal weight value generation. Because these are recursive neural network teaching techniques, the weight values are adjusted for each set of control distribution data (desired forces/moments and corresponding feasible propulsion system forces). Proper setting of weight values increases the chance that all on-line generated data will be accurate. Once all the weight values have been generated for the neural network structure, the neural network is implemented as a controller in the control computer 60 of a vehicle 50, as shown in FIG. 1. See block 104. Neural network operation in a vehicle is shown in FIG. 5 and described below. The neural network can be implemented as an analog electric circuit, a computer program, an application specific integrated circuit or any other structure that allows the neural network to function properly.

Returning to FIGS. 3A and 3B, the neural network includes an input layer, one or more hidden layers, and an output layer. The elements that make up each layer of a neural network are referred to as neurons or nodes 120. Inputs are fed forward from the input layer to the hidden layers and then to the output layer. Recursive neural network structures may also have outputs from the layers fed back to preceding layers. The number of neurons 120 in each layer is determined before the network is trained. Typically, there is one input node for each input variable and one output node for each output. The input and output layers need not be directly connected (FIG. 3B). In a unified neural network (FIG. 3A), every input node is connected to every node in the following hidden layer and every node in a hidden layer is connected to every node in the following adjacent hidden layer or output layer, depending on the number of hidden layers. Each connection to a particular node is weighted.

Figure 4:
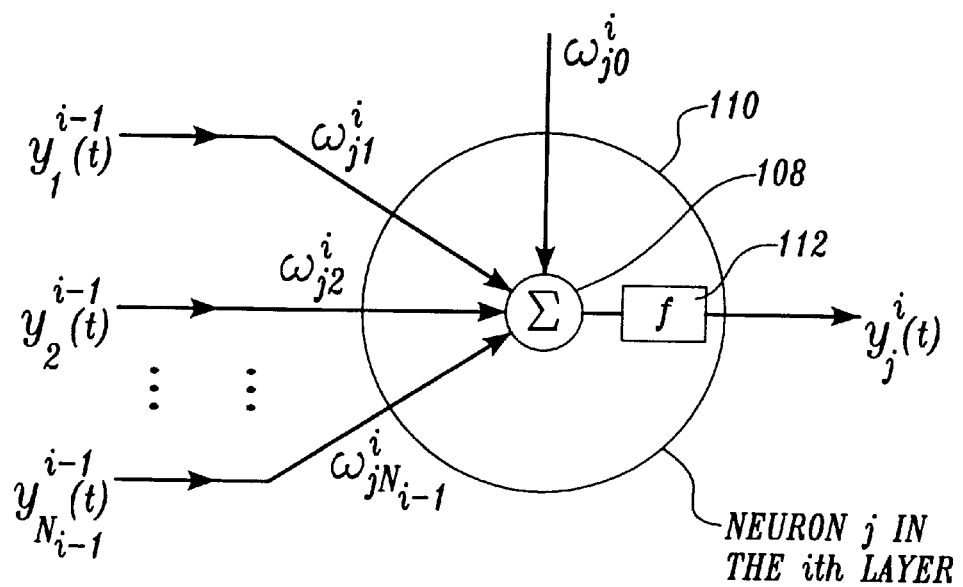
FIG. 4 is a diagram of a single neuron model of the present invention.

The number of nodes in the input and output layers is determined before the network is trained and correspond to the number of calculated sets of desired forces and feasible propulsion system forces. The number of neurons in the one or more hidden layers is determined during training. FIG. 4 illustrates a single neuron model of a multi-layer perceptron neural network. Equation 1 describes the product of the summation 108 performed within the single neuron model 110 shown in FIG. 4:

$$y\_in_j^i(t) = \omega_{j,0}^i + \sum_{k=1}^{N_{i-1}} \omega_{j,k}^i \cdot y_k^{i-1}(t) \qquad (1)$$

where:

j=node number i=neural network layer number (0 to L)

k=weight value number t=index to an input pattern $N_i$=the number of neurons in the i-th layer of the network L=the number of layers in the network $\omega_{j,k}^i$ is the k-th weight of the j-th neuron in the i-th layer. When k=0, weight value is the bias weight.

$$y_j^i(t) = f(y\_in_j^i(t))$$

is the product of neuron 110 or nodal activation function 112. The nodal activation function 112 is a sigmoidal, radial basis, linear or other function. The nodal activation function sets a value produced by the neuron or activates or deactivates the neuron 110.

Derivatives used in the training process of the invention are based on expressions for dynamic derivatives of recurrent multi-layer perceptrons. The equation used in the training process is written as:

$$\frac{\partial^+ y_j^i(t)}{\partial \omega_{g,h}^l} = f'(y\_in_j^i(t)) \cdot \left\{ (1-\delta_{1,i}) \cdot \sum_{k=1}^{N_{i-1}} \omega_{j,k}^i \cdot \frac{\partial^+ y_k^{i-1}(t)}{\partial \omega_{g,h}^l} + \delta_{1,i} \cdot \delta_{g,j} \cdot \left[ \sum_{k=1}^{N_{i-1}} \delta_{h,k+1} \cdot y_k^{i-1}(t) + \delta_{h,1} \right] \right\}, 1 \le i$$

where:

$\delta_{ij}$=the Kronecker delta

If i=j, $\delta_{ij}$=1 and otherwise it is equal to zero.

$$f'(y\_in_j^i)$$

is the derivative of the neuron's activation function 112. $\partial^+/\partial(\cdot)$ is the ordered derivative.

If the neural network training method used is a traditional back-propagation algorithm, the weight values are determined such that neural network outputs closely match the feasible propulsion system forces that correspond to the training data. At the beginning of neural network training, the connection weights in the network are set to initial values that may be randomized. The training data is then presented to the network one at a time. In accordance with the present invention, the training data includes various sets of desired forces/moments and the predetermined corresponding feasible propulsion system forces for a wide range of vehicle operation. The training process continues through all sets of the training data adjusting the weight values as necessary. Each set provides its own distinct neural network input and output. Accuracy between the discrete values of training data is enhanced by applying random components to the training data as is appreciated by those of ordinary skill in the art of neural network design.

Once the neural network structure has been trained, i.e. all the weight values have been generated for the neural network structure, the neural network structure is implemented as a controller 66 in the control computer 60 of the vehicle 50, as shown in FIG. 1. The neural network structure can be implemented as an analog electric circuit, a computer program, an application specific integrated circuit or any other structure that allows the neural network structure to function properly. FIG. 5 illustrates the process of determining propulsion system forces with a fully trained neural network structure implemented as the controller 66. At block 130, the vehicle's position and motions are sensed and control signals are generated according to automatic or manual control inputs. Next at block 132, desired vehicle forces generated from the sensed vehicle position and motions and the generated control signals based on predefined vehicle compensation and control laws. Finally at block 134, the generated desired vehicle forces/moments are entered into the trained neural network structure. The entered information propagates through the neural network structure getting manipulated according to the trained nodal weight values, thereby generating outputs or feasible propulsion system forces.

Figure 6:
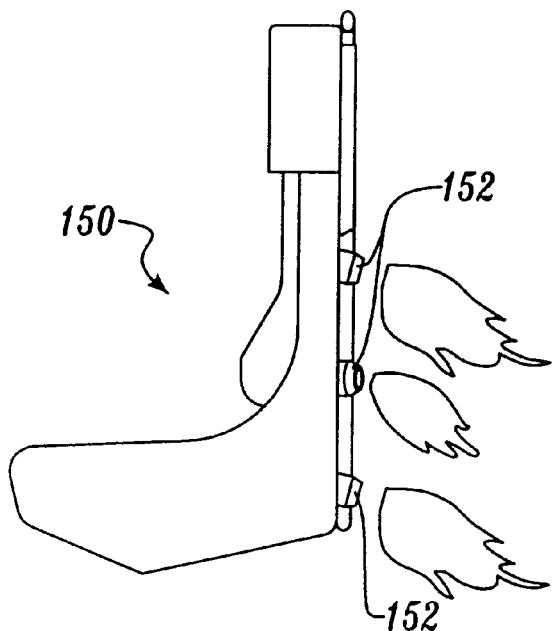
FIG. 6 is a side view of an ejection seat.
Figure 7:
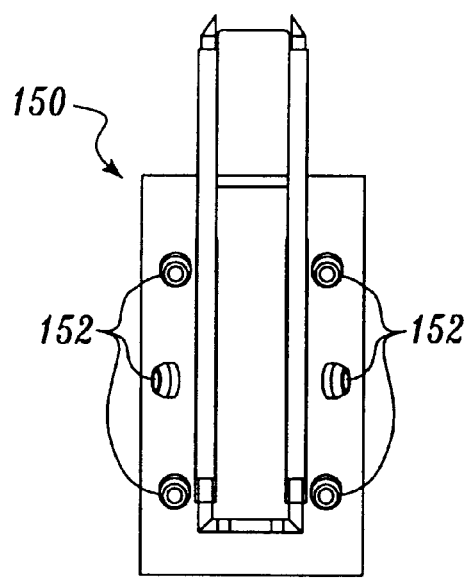
FIG. 7 is a rear view of the ejection seat shown in FIG. 6.
Figure 8:
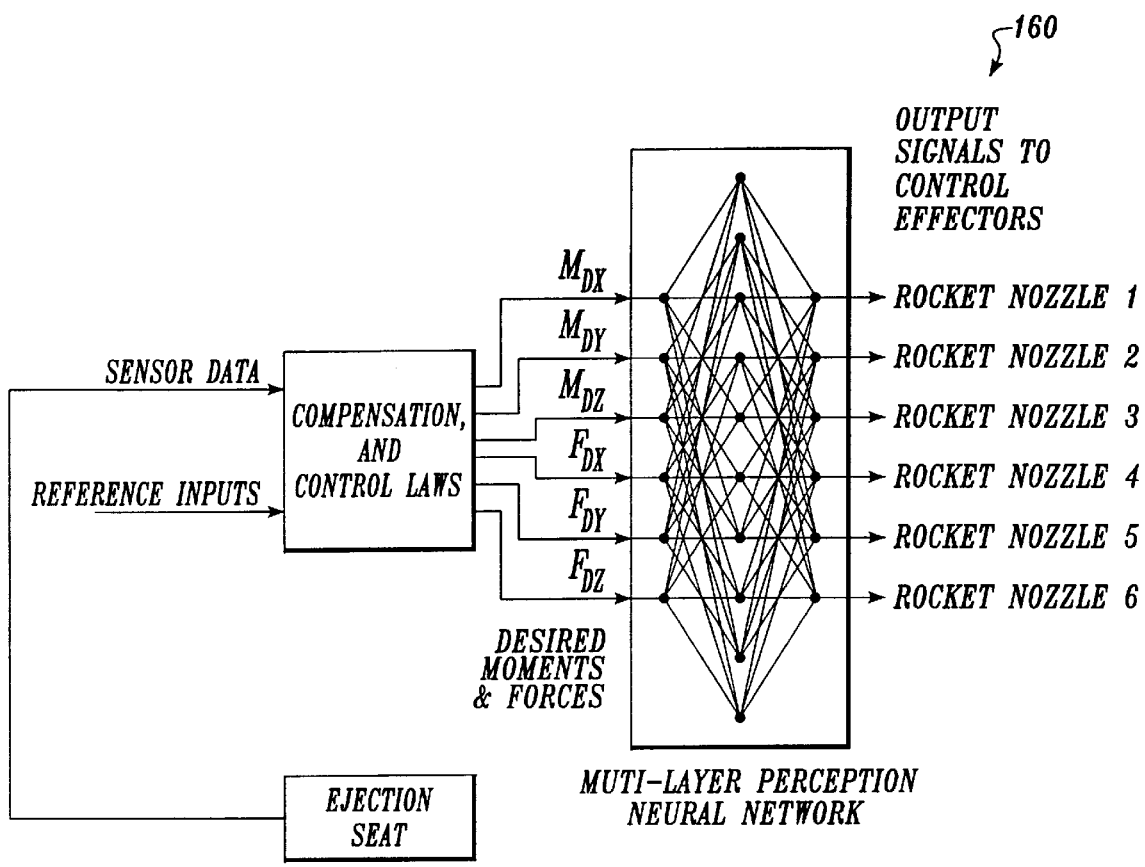
FIG. 8 is a data flow chart of an exemplary embodiment of the present invention suitable for use with an ejection seat of the type shown in FIGS. 6 and 7.

FIGS. 6–8 illustrate the present invention implemented in the propulsion control system of a six degree of freedom ejection seat 150. This example is for illustrative purposes only. FIG. 6 is a side view and FIG. 7 is a rear view of the ejection seat 150 that includes six controllable rocket nozzles 152. Prior to operation of the ejection seat 150, the neural network is selected and trained. As shown in FIG. 8, the input neural network training data is the determination of sets of desired ejection seat moments $M_{DX}$, $M_{DY}$, $M_{DZ}$ and forces $F_{DX}$, $F_{DY}$, $F_{DZ}$. The range of desired forces/moments is determined via off-line simulation from ejection seat sensor and reference data and ejection seat compensation and control laws. The sets of desired forces/moments are then calculated as evenly spaced values within the range. The neural network output training data are sets of feasible rocket nozzle control data 160 for each rocket nozzle 152. The sets of best feasible rocket nozzle control data 160 is calculated off-line using engineering analysis software that simulates the ejection seat 150 and linear iterative numerical algorithms. Each set of feasible rocket nozzle control data corresponds to a set of desired moments and forces. Each set of feasible rocket nozzle control data includes an output that is supplied to a corresponding rocket nozzle. The best feasible rocket nozzle control data is produced based on seat kinematics, ejection seat capabilities and maximum propulsion system and individual nozzle thrust capabilities. Other ejection seat limitations may further define best feasible rocket nozzle forces.

Propulsion system control distribution input data is calculated for numerous ejection seat linear and angular attitudes, rates and accelerations that include maximum seat values to provide the greatest range of data for accurate neural network training. Prior to actual ejection seat operation, these angular attitudes and rates and accelerations of the ejection seat 150 are the same as those experienced by the aircraft, because the ejection seat 150 is fixed within the aircraft. The neural network is then trained off-line using the calculated control distribution input and output data that covers the entire range of seat operation.

The trained neural network structure is implemented in the ejection seat's control computer. The neural network structure can be implemented as software, application specific integrated circuits, or analog electronic hardware. Once the neural network structure has been implemented, the ejection seat is ready for on-line operation.

During on-line operation, desired forces/moments are continually being generated. The neural network determines feasible rocket nozzle forces based on the generated desired forces/moments. The desired force/moment data propagates through the trained neural network structure based on the type of network and the determined weight values to produce feasible rocket nozzle data for each rocket nozzle. The rocket nozzles respond to the produced feasible rocket nozzle data, when the ejection seat has been activated.

Figure 9A:
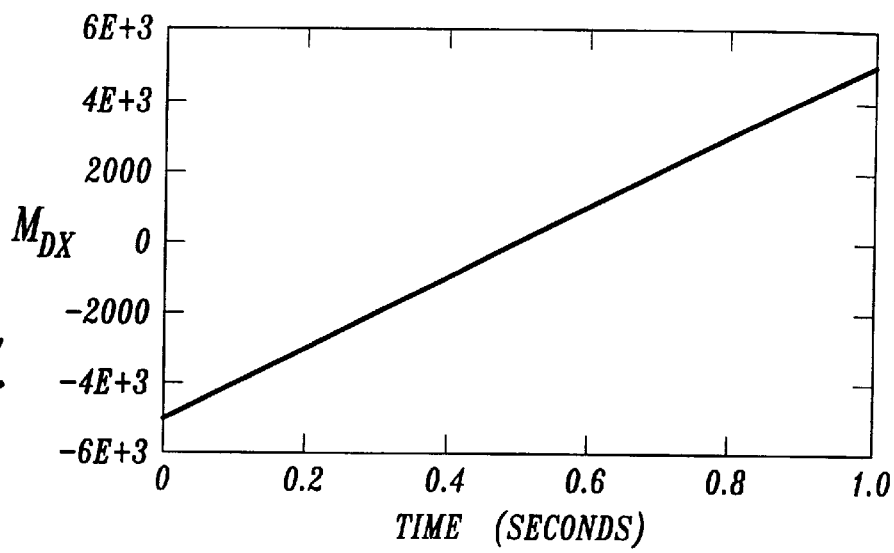
FIG. 9 is a graph of three varying inputs into a control computer formed in accordance with the present invention and formed in accordance with a previously known method.
Figure 9B:
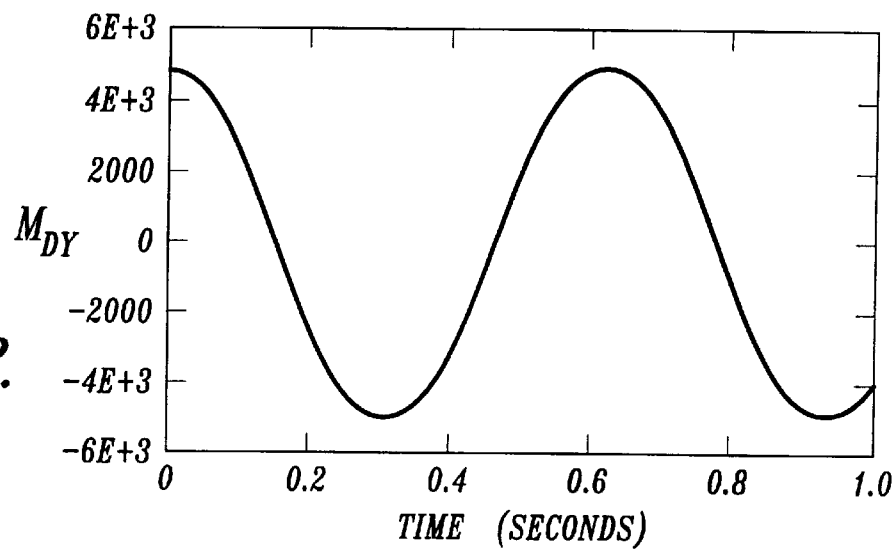
Figure 9C:
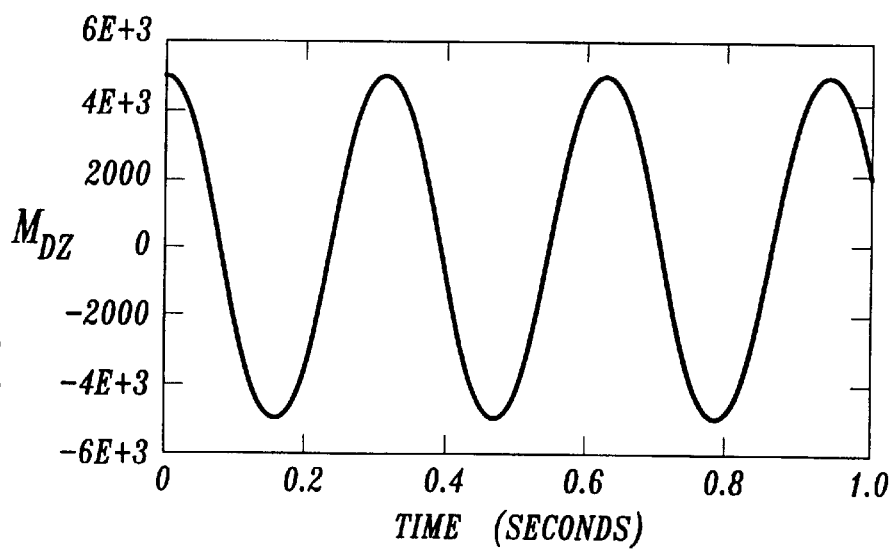
Figure 10:
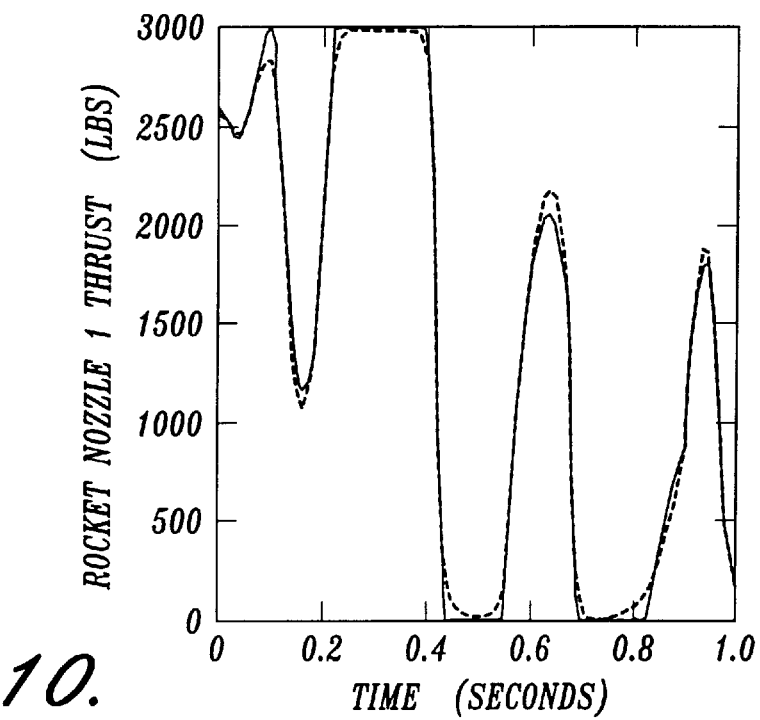
FIGS. 10 and 11 are graphs comparing a control computer formed in accordance with the present invention and formed in accordance with a previously known method simulated in the ejection seat shown in FIGS. 6 and 7.
Figure 11:
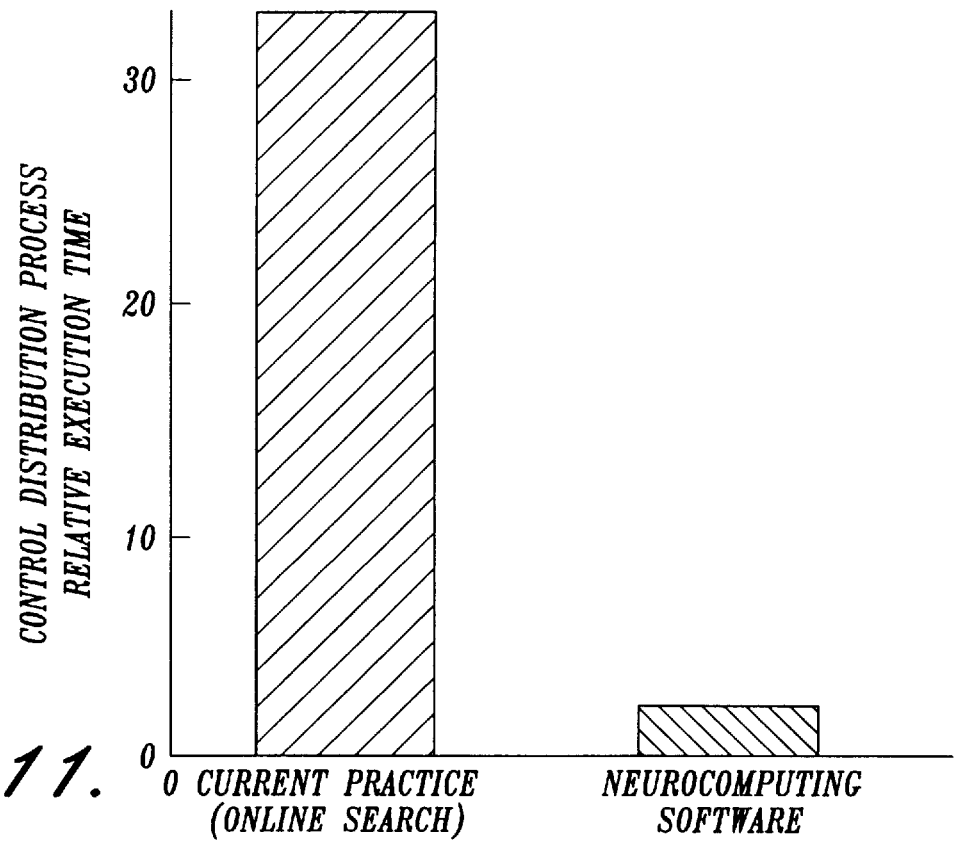

FIG. 9 illustrates time varying input values to a control computer of a vehicle. The time varying input values are three desired forces/moments (moments $M_{DX}$, $M_{DY}$ and $M_{DZ}$). FIGS. 10 and 11 illustrate a comparison of results of two control computers of the ejection seat shown in FIGS. 6–8 with the input values shown in FIG. 9. One of the two control computers includes the previously known method of on-line searching and the other of the two control computers includes the present invention of a trained neural network to generate feasible force data. In this example, only desired moments were used for the comparison. In order to provide a proper comparison between the two control computers, each of the moments has been chosen to vary differently in time (0–1 sec) between preset desired moment values (–5,000 to +5,000) as shown in FIG. 9. As a result, a wide range of ejection seat desired motion values are used in the comparison.

FIG. 10 illustrates the thrust of rocket nozzle 1 in pounds of thrust as determined by the two control computers over the same time period given the input moment values shown in FIG. 9. The on-line searching control computer method is illustrated by the solid line and the neural network control computer is illustrated by the dotted line. It is noted that the neural network control computer maps nearly identical to that of the on-line search control computer. The difference in the output of the control computer for each of these techniques is virtually identical and thus, processing accuracy is maintained.

However, as shown in FIG. 11, the processing time of the on-line search control computer is significantly slower than the neural network control computer. An engineering work station accurately simulated the processing of each control computer with the input being the moment graphs shown in FIG. 9. The engineering work station determined that the on-line search control computer took approximately 0.33 CPU seconds to determine rocket nozzle thrust data and the neural network control computer took approximately 0.01 CPU seconds to perform the same task. This decrease in processing speed of 30 times or greater significantly reduces the risk that can occur when processing lags the requirements of the dynamically moving vehicle.

In summary, the neural network control computer generates similarly accurate propulsion control data at a fraction of the speed of prior techniques. Because command processing time is greatly reduced, time delays in processing control commands and dangerous, lagging propulsion system responses are avoided.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A control system for controlling a propulsion system of a vehicle, said propulsion system including at least one propulsion effector, said control system comprising:

at least one sensor for sensing vehicle position and motions;

control means for generating control signals;

a generator for generating desired vehicle forces from the sensed vehicle position and motions and the generated control signals based on predefined vehicle compensation and control laws; and a neural network controller for generating propulsion commands for the at least one propulsion effector by propagating the generated desired vehicle forces through the neural network controller.

2. A method for controlling a propulsion system of a vehicle, said propulsion system including at least one propulsion effector, said method comprising:

sensing vehicle position and motions;

generating control signals based on control inputs;

generating desired vehicle forces from the sensed vehicle position and motions and the generated control signals based on predefined vehicle compensation and control laws; and generating propulsion commands for the at least one propulsion effector by propagating the generated desired vehicle forces through a neural network.

3. A method for training a neural network to control a propulsion system of a vehicle, said propulsion system including at least one propulsion effector, said method comprising:

generating sets of desired vehicle forces for possible vehicle command signals, position and motions based on predefined vehicle compensation and control laws;

generating sets of feasible propulsion system forces that correspond to sets of generated desired vehicle forces;

establishing a neural network structure; and generating nodal weight values for the established neural network structure based on the generated sets of generated desired vehicle forces and the corresponding sets of feasible propulsion system forces.

4. The method of claim 3, wherein said generated sets of feasible propulsion system forces including at least one propulsion effector comprises propulsion effector commands.

5. The method of claim 3, wherein said generating sets of feasible propulsion system forces is based on a linear iterative search algorithm and propulsion system limitations.

6. The method of claim 5, wherein the linear iterative search algorithm proportionally deviates desired forces to generate propulsion commands.

7. The method of claim 5, wherein the linear iterative search algorithm deviates in a prioritized order from the desired forces.

8. The method of claim 3, wherein the established neural network structure is a unified structure.

9. The method of claim 3, wherein the established neural network structure is a decoupled structure.

10. The method of claim 3, wherein the neural network structure comprises neurons with activation functions.

11. The method of claim 10, wherein the activation functions are sigmoidal functions.

12. The method of claim 10, wherein the activation functions are radial basis functions.

13. The method of claim 10, wherein the activation functions are linear functions.

14. The method of claim 3, wherein generating nodal weight values for the established neural network structure further comprises generating nodal weight values based on dynamic derivatives and a node decoupled extended Kalman filter technique.

15. The method of claim 3, wherein generating nodal weight values for the established neural network structure further comprises generating nodal weight values based on a gradient descent technique.

16. The method of claim 3, wherein the neural network structure is implemented as an analog electronic circuit.

17. The method of claim 3, wherein the neural network structure is implemented as a computer program.

18. The method of claim 3, wherein the neural network structure is implemented as an application specific integrated circuit.

19. The method of claim 3, wherein said generating sets of feasible propulsion system forces is based on an optimization algorithm with an objective function and propulsion system limitations.

20. The method of claim 3, wherein said generating sets of feasible propulsion system forces is based on a multiple step reduction algorithm with propulsion system limitations.

* * * * *

UNITED STATES PATENT AND TRADEMARK OFFICE
CERTIFICATE OF CORRECTION

PATENT NO. : 6,173,218 B1
DATED : January 9, 2001
INVENTOR(S) : J. L. Vian

Page 1 of 1

It is certified that error appears in the above-identified patent and that said Letters Patent is hereby corrected as shown below:

Title page,
Column 1,
Item [56], References Cited (U.S. Patents) insert in appropriate numerical order the following:

| | | |
|---|---|---|
| -- 4,721,273 | 1/1988 | Trikha |
| 4,846,421 | 7/1989 | Trikha |
| 5,469,530 | 11/1995 | Makram-Ebeid |
| 5,493,631 | 2/1996 | Huang et al. |
| 5,583,771 | 12/1996 | Lynch et al. |
| 5,590,218 | 12/1996 | Ornstein -- |

Signed and Sealed this

Thirtieth Day of October, 2001

*Attest:*

NICHOLAS P. GODICI
*Attesting Officer*    *Acting Director of the United States Patent and Trademark Office*